US012246604B1

(12) United States Patent
Sylvester et al.

(10) Patent No.: US 12,246,604 B1
(45) Date of Patent: *Mar. 11, 2025

(54) ROADWAY SECTION HAVING EMBEDDED WIRELESS CHARGE ELEMENTS

(71) Applicant: Integrated Roadways, LLC, Chicago, IL (US)

(72) Inventors: Tim Sylvester, Kansas City, MO (US); Tiziano Pedersoli, Overland Park, KS (US)

(73) Assignee: RALLY CAPITAL SERVICES, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,627

(22) Filed: Jan. 19, 2023

Related U.S. Application Data

(63) Continuation of application No. 18/145,374, filed on Dec. 22, 2022, and a continuation of application No. 18/145,271, filed on Dec. 22, 2022, now abandoned.

(51) Int. Cl.
*B60L 53/12* (2019.01)
*E01C 9/00* (2006.01)
*H02J 50/10* (2016.01)

(52) U.S. Cl.
CPC ............... *B60L 53/12* (2019.02); *E01C 9/00* (2013.01); *H02J 50/10* (2016.02)

(58) Field of Classification Search
None
See application file for complete search history.

(56) References Cited

U.S. PATENT DOCUMENTS

| 2007/0081858 A1* | 4/2007 | Yee ........................... E04B 5/04 404/40 |
| 2017/0136899 A1* | 5/2017 | Mashinsky ............. B60L 53/52 |
| 2020/0180447 A1* | 6/2020 | Nishimura .............. H02J 50/80 |
| 2020/0212721 A1* | 7/2020 | Narayana Bhat ..... H02J 50/402 |

\* cited by examiner

*Primary Examiner* — Jared Fureman
*Assistant Examiner* — Aqeel H Bukhari
(74) *Attorney, Agent, or Firm* — Thompson Coburn LLP

(57) ABSTRACT

A roadway section enables dynamic wireless power transfer to a vehicle. The roadway section comprises pavement material and a wireless power charger. The pavement material defines a pavement section volume having a top surface on which the vehicle traverses. The wireless power charger includes a conductive element located at least partially within the pavement section volume and configured to emit a magnetic field toward the top surface of the pavement section volume to wirelessly transfer electric power to the vehicle. The conductive element includes an upper surface that is located at least five centimeters (5 cm) below the top surface of the pavement section volume.

17 Claims, 8 Drawing Sheets

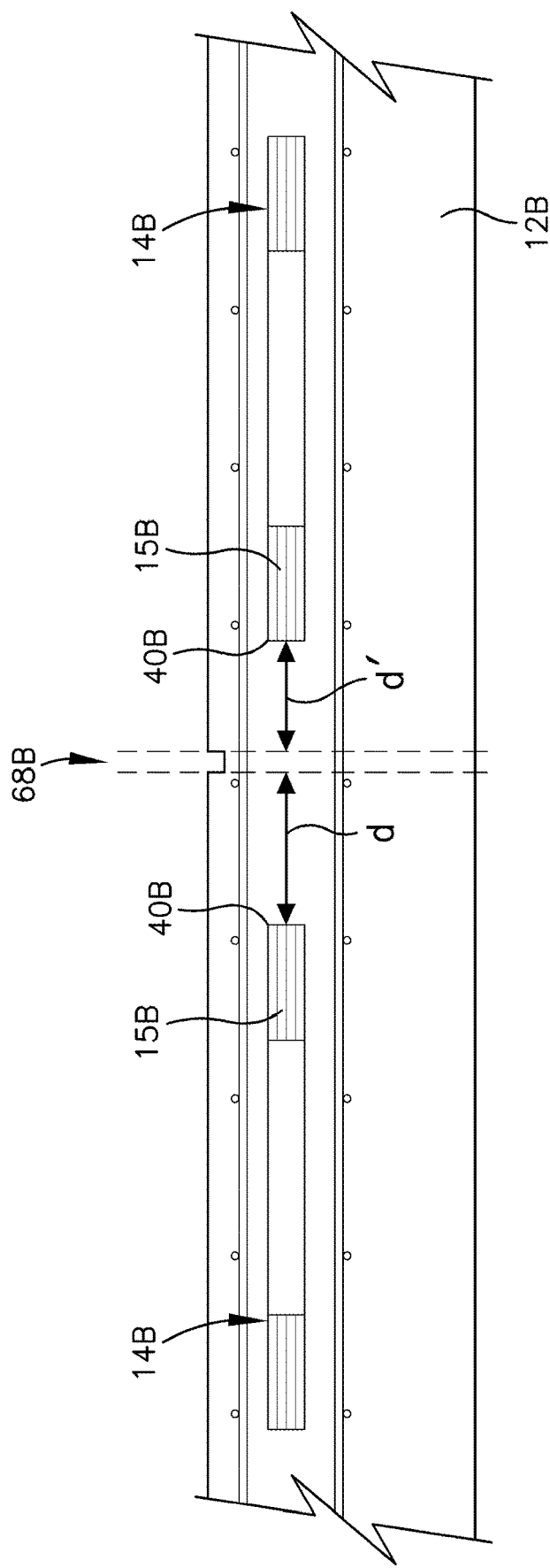

ROADWAY SECTION HAVING EMBEDDED WIRELESS CHARGE ELEMENTS

CROSS-REFERENCE TO RELATED APPLICATIONS

The present application is a continuation of identically-titled U.S. patent application Ser. No. 18/145,374, filed Dec. 22, 2022, and additionally claims priority to identically-titled U.S. patent application Ser. No. 18/145,271, filed Dec. 22, 2022, and the entire disclosure of each of the foregoing applications is hereby incorporated by reference herein.

BACKGROUND

Battery-powered electric vehicles are becoming increasingly common in many applications, including for both individual and commercial transportation. However, such vehicles often do not have the same range capabilities as their similarly priced combustion engine counterparts. Specifically, to obtain more range, more battery materials must be used to form a larger battery, which often renders a vehicle prohibitively expensive for too many individuals. Additionally, the weight of such a longer-range battery incurs additional engineering costs in the design and manufacture of the vehicle and additional costs due to the use of additional and/or enhanced non-battery components. Further, charging stations are often scarce, and charging a battery at a charging station can be time consuming compared to filling a fuel tank.

The background discussion is intended to provide information related to the present invention which is not necessarily prior art.

SUMMARY OF THE INVENTION

The present invention addresses one or more of the above-described problems and other problems by providing a roadway section that enables dynamic wireless power transfer to a vehicle.

A roadway section constructed according to an embodiment of the present invention enables dynamic wireless power transfer to a vehicle. The roadway section comprises pavement material and a wireless power charger. The pavement material defines a pavement section volume having a top surface on which the vehicle traverses. The wireless power charger includes a conductive element located at least partially within the pavement section volume and configured to emit a magnetic field toward the top surface of the pavement section volume to wirelessly transfer electric power to the vehicle.

The conductive element includes an upper surface that is located at least five centimeters (5 cm) below the top surface of the pavement section volume. By providing at least 5 cm of space between the top surface and the conductive element, the conductive element is protected from forces imposed on the pavement material by vehicles and/or from maintenance implements, tools or the like that may penetrate the top surface (e.g., in connection with resurfacing operations or sensor installation/removal). In one or more embodiments, the separation is not so great that it inhibits provision of sufficient magnetic flux density to effectively transfer electric power to the vehicle.

A roadway section constructed according to another embodiment of the present invention broadly comprises a plurality of precast pavement slabs and a plurality of wireless power chargers. Each of the precast pavement slabs has a top surface on which the vehicle traverses and side surfaces for abutting adjacent precast pavement slabs. The wireless power chargers each respectively include a conductive element. Each conductive element is located at least partially within one of the precast pavement slabs and is configured to transfer electric power to the vehicle as the vehicle traverses the top surface. Each of the conductive elements includes an upper surface that is located at least five centimeters (5 cm) below the corresponding one of the top surfaces.

A roadway section constructed according to another embodiment of the present invention broadly comprises pavement material and a plurality of wireless power chargers. The pavement material defines a pavement section volume having a top surface on which the vehicle traverses. The wireless power chargers each respectively include one of a plurality of conductive coils located at least partially within the pavement section volume. Each conductive coil is configured to wirelessly transfer electric power to the vehicle. Each conductive coil includes an upper surface that no closer to the top surface than two and a half centimeters (2.5 cm).

A roadway section constructed according to another embodiment of the present invention broadly comprises pavement material and a wireless power charger. The pavement material defines a pavement section volume having a top surface on which the vehicle traverses and side surfaces. The wireless power charger includes a conductive element located at least partially within the pavement section volume and is configured to emit a magnetic field toward the top surface of the pavement section volume to wirelessly transfer electric power to the vehicle. The conductive element defines a profile with an outer radius that is located at least two and a half centimeters (2.5 cm) away from the side surfaces of the pavement section volume.

A roadway section constructed according to another embodiment of the present invention broadly comprises a plurality of precast pavement slabs and a plurality of wireless chargers. Each of the plurality of precast pavement slabs have a top surface on which the vehicle traverses and side surfaces for abutting adjacent slabs. The plurality of wireless chargers each respectively comprise one of a plurality of conductive elements located at least partially within one of the precast pavement slabs. The conductive elements are configured to transfer electric power to the vehicle. Each of the conductive elements defines an outer radius that is located at least two and a half centimeters (2.5 cm) away from the side surfaces.

A roadway section constructed according to another embodiment of the present invention broadly comprises pavement material and a plurality of wireless power chargers. The pavement material defines two pavement section volumes each having side surfaces and a top surface on which the vehicle traverses. The wireless power chargers each respectively comprise one of a plurality of conductive coils located at least partially within respective ones of the pavement section volume. The conductive elements are configured to wirelessly transfer electric power to the vehicle. Each of the conductive coils defines a profile with an outer radius that is no closer than two and a half centimeters (2.5 cm) away from a nearest corresponding one of the side surfaces.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
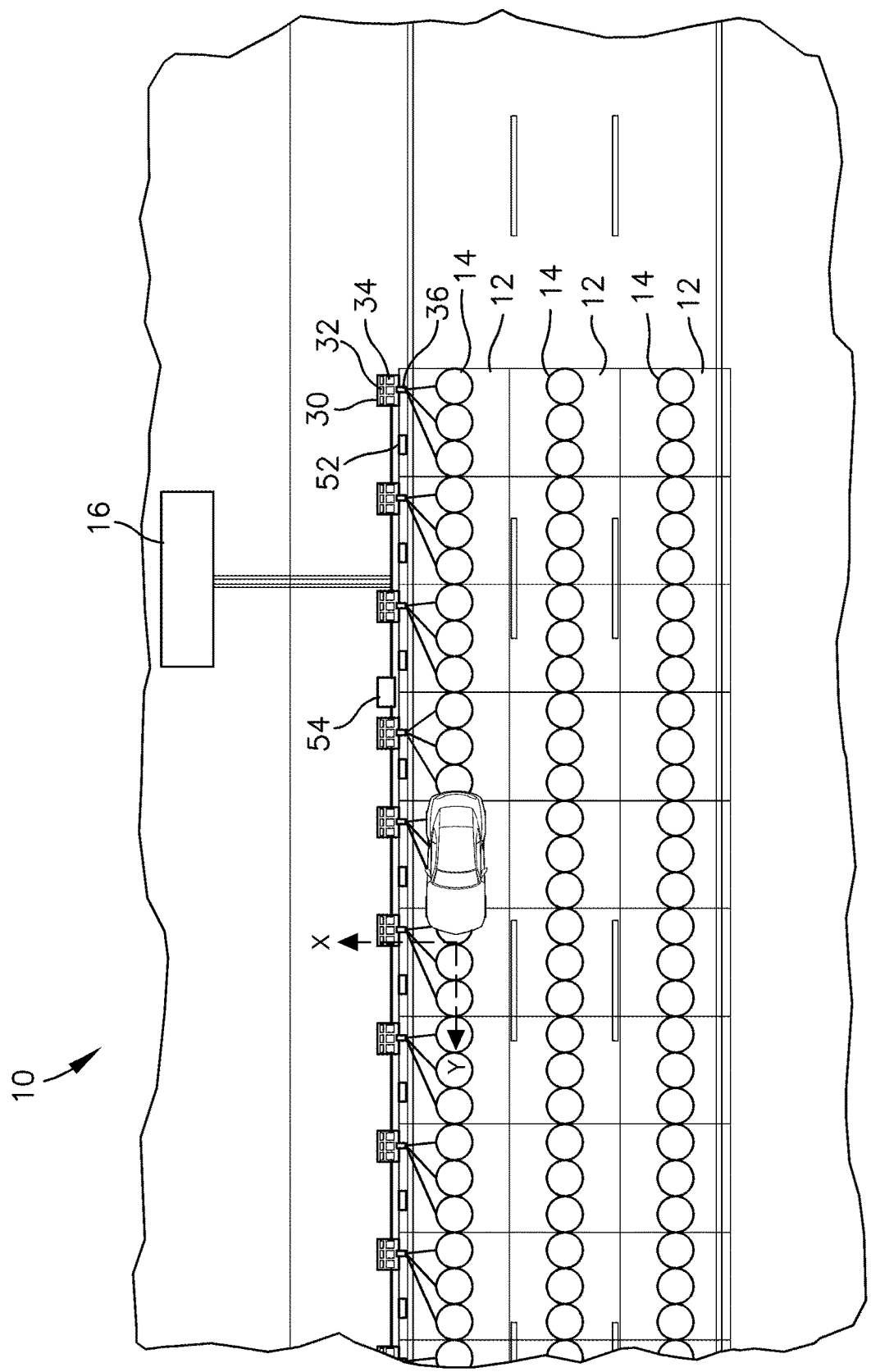
FIG. 1 is a top plan view of pavement system constructed in accordance with embodiments of the present invention.
Figure 7:
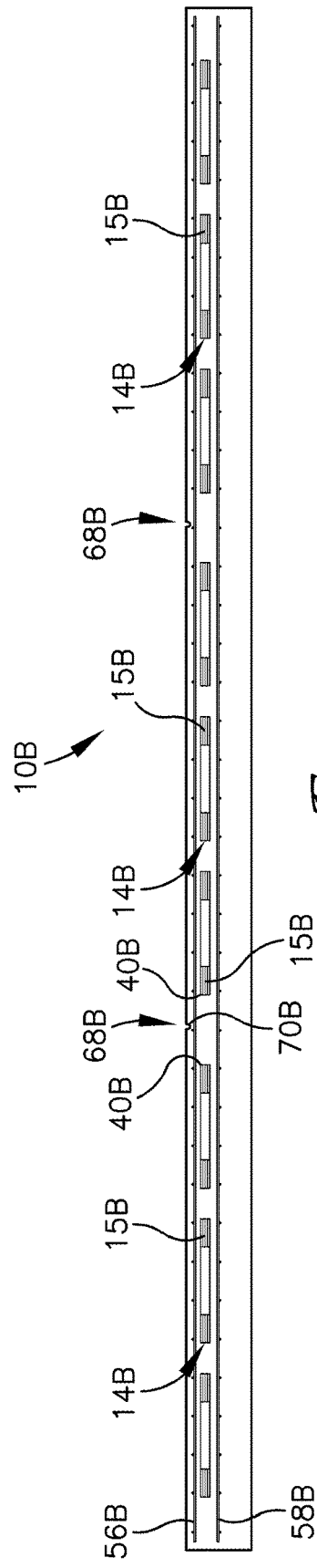

FIG. 7 is a cross section of alternative roadway sections from the pavement system of FIG. 1, taken along or parallel to a y-axis of the system and bisecting a plurality of wireless power chargers, particularly illustrating the wireless power chargers positioned between an upper reinforcement layer and a lower reinforcement layer, all embedded within the roadway section; and FIG. 8 is a side sectional view of a portion of the slab of the pavement system of FIG. 7.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

FIG. 1 illustrates an exemplary pavement system 10 in accordance with embodiments of the present invention. The system 10 includes a plurality of slabs 12 aligned along a longitudinal or y-axis corresponding to a direction of travel of vehicles or other masses across top surfaces of the slabs 12. The system includes three (3) lanes, each being respectively formed from a plurality of slabs 12 aligned along the y-axis. Each lane may include one or more roadway sections, each of which may include one or more slabs 12. It is foreseen that the pavement system may include more or fewer lanes without departing from the spirit of the present invention.

The slabs 12 may be pre-cast slabs comprising concrete paving material, described in the exemplary embodiment in more detail below. It should be noted, however, that in one or more embodiments the pavement system may comprise one or more lanes formed of cast-in-place concrete installations (as discussed in further detail below), continuous pour asphalt pavement material (as discussed in further detail below), or other pavement types. In cast-in-place installations, roadway sections may include one or more lengths of roadway separated by saw cut joints (as discussed in further detail below), typically made to reduce the chances of roadway damage/cracking from cyclical expansion and contraction.

Each slab 12 of the illustrated embodiment includes three (3) wireless chargers 14. The wireless chargers 14 may include or comprise wireless charge emitters and/or transceivers. Each wireless charge emitter and/or transceiver preferably includes one or more conductive elements 15 (see FIG. 3), such as coil(s) or layers of conductive material (discussed in more detail below), configured to conduct current of supplied power in a spatial pattern that generates and projects a magnetic field extending up and above the top surface of the corresponding roadway section for wireless battery charging of passing vehicles (e.g., according to Faraday's law of induced voltage). Each of the wireless chargers 14 may be configured for unidirectional charging of batteries of vehicles passing along a top surface of the slabs 12 or for bidirectional charging in communication with electrical circuits positioned on or adjacent to the top surface of the slabs.

In one or more embodiments, the wireless chargers 14 are configured to produce, generate, or emit a magnetic field upward for induced charging of an electrical circuit (e.g., a battery circuit) of a passing vehicle. The electrically-conductive element 15 of each wireless charger 14 may comprise one or more conductive wires or plates arranged, placed, or positioned to form a coil or toroid shape that is substantially symmetrical across at least two (preferably perpendicular) axes. One of ordinary skill will appreciate that the coil or toroid may be rectangular, may be a spiral, may comprise a toroid with a rectangular or polygonal cross-section, may comprise a toroid with a circular cross section, or may be more irregularly shaped while retaining the symmetrical properties outlined herein, without departing from the spirit of the present invention. One of ordinary skill will appreciate that an individual slab or roadway section may include more or fewer wireless chargers, at different and/or variable spacing and/or of different configuration/shape, without departing from the spirit of the present invention.

One of ordinary skill will appreciate that each wireless power charger 14 preferably includes one or more additional electrically conductive wires or other conductors-such as power supply wires—in addition to the electrically-conductive element 15 for generating the magnetic field for inductive charging within the scope of the present invention. It should also be noted that the preferred wireless power charger 14 will additionally be encased, housed or coated in an electrically insulating or non-electrically conductive material layer (e.g., comprising rubber). In the illustrated embodiments, the aforementioned layer is relatively thin and, for purposes of illustration, lies at and covers or coats the outside (e.g., outer and upper) boundaries or margins of the electrically conductive element 15. However, it is foreseen that in some embodiments the casing/housing or other non-conductive features of the chargers, and/or the conductors which are not part of the electrically conductive element, may in some cases extend significantly outside of the boundaries or margins (e.g., the upper and/or radially outer surfaces or profiles) of an electrically conductive element (for example) without departing from the spirit of the present invention.

Figure 5:
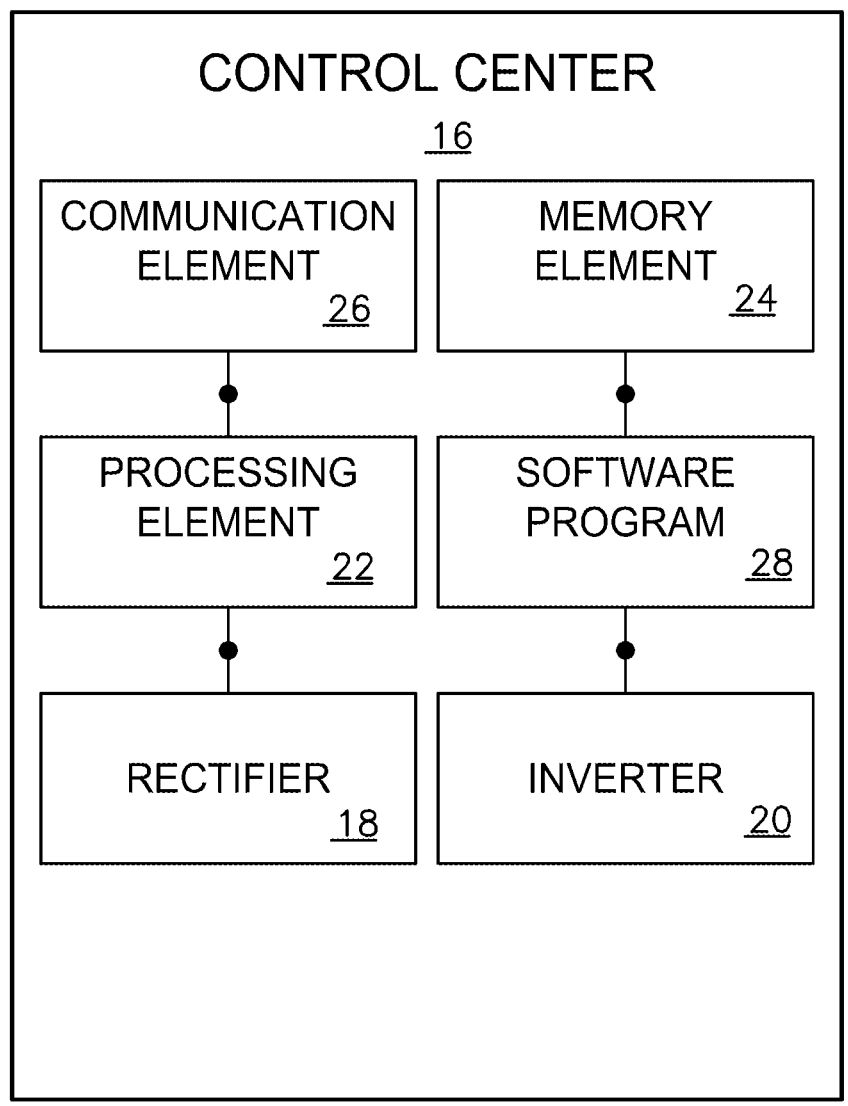
FIG. 5 is a schematic diagram depicting selected components of a control center of the pavement system of FIG. 1.

Power to the wireless chargers 14 is supplied, conditioned, tuned, transformed, converted and/or otherwise changed and/or controlled by one or more control centers 16. Turning briefly to FIG. 5, each control center 16 may include a rectifier 18, an inverter 20, a processing element 22, a memory element 24, a communication element 26, and a software program 28, each of which is discussed in more detail below. It should also be noted that one or more components of a control center may be housed remotely and/or embedded in or with components of a roadway section without departing from the spirit of the present invention.

The control center 16 receives power from a power supply such as a public utility line and/or from upstream switchgear (not shown), and prepares same for supply to the wireless chargers 14. For example, in one or more embodiments, the control center 16 receives alternating current (AC) power at 750 KW and 110 A, and increases the frequency of the power using the rectifier 18 and inverter 20 for supply to the wireless chargers 14.

The control center 16 may initially supply power to junction boxes 30. The switching device(s) 32 and corresponding tuning network device(s) 34 may serve as intermediate components for electrical communication between the wireless chargers 14 and the control center 16. One of ordinary skill will appreciate that more, fewer and/or different intermediate components may be used to supply power to wireless chargers without departing from the spirit of the present invention. The exemplary junction boxes 30 are adjacent the sides of the corresponding slabs 12 and may be set or embedded in a shoulder of the roadway, with top portions approximately flush with the top surface of the roadway to provide periodic access thereto for maintenance.

Each junction box 30 may contain or include one or more switching device(s) 32 and corresponding tuning network device(s) 34, with each pair of switching device 32 and tuning network device 34 supplying power to one of the wireless chargers 14. The switching device 32 may, for example, be a metal-oxide-semiconductor field-effect transistor (MOSFET) switch or any other switch device for switching and/or amplifying the power signal to the corresponding wireless charger 14. The tuning network device 34 may, for example, be a transformer configured to increase or decrease the voltage and/or other characteristics of the power for supply to the corresponding wireless charger 14. The wires or conductors carrying the power to the wireless chargers 14 may be routed through one or more conduits and/or edge connectors 36 illustrated in FIG. 1.

In one or more embodiments, the processing element 22, the memory element 24, the communication element 26 and/or the software program 28 comprise a master controller. The master controller may be in electronic communication (e.g., via the communication element 26) with one or both of the switching device 32 and/or tuning network device 34 corresponding to each of the wireless chargers 14. The electronic communication may permit such electronic devices in each of the junction boxes 30 to provide data regarding operation and/or faults of the wireless chargers 14 and/or supporting power supply or control infrastructure and/or intermediate components. The electronic communication may also or alternatively permit the master controller to communicate commands to the junction box 30 electronic components and/or components of the wireless chargers 14, for example where the master controller commands one or more switching device(s) 32 to power or shut down power to the corresponding wireless charger(s) 14 or commands one or more network tuning device(s) 34 to increase or decrease the voltage of the power supplied to the corresponding wireless charger(s) 14.

Figure 2A:
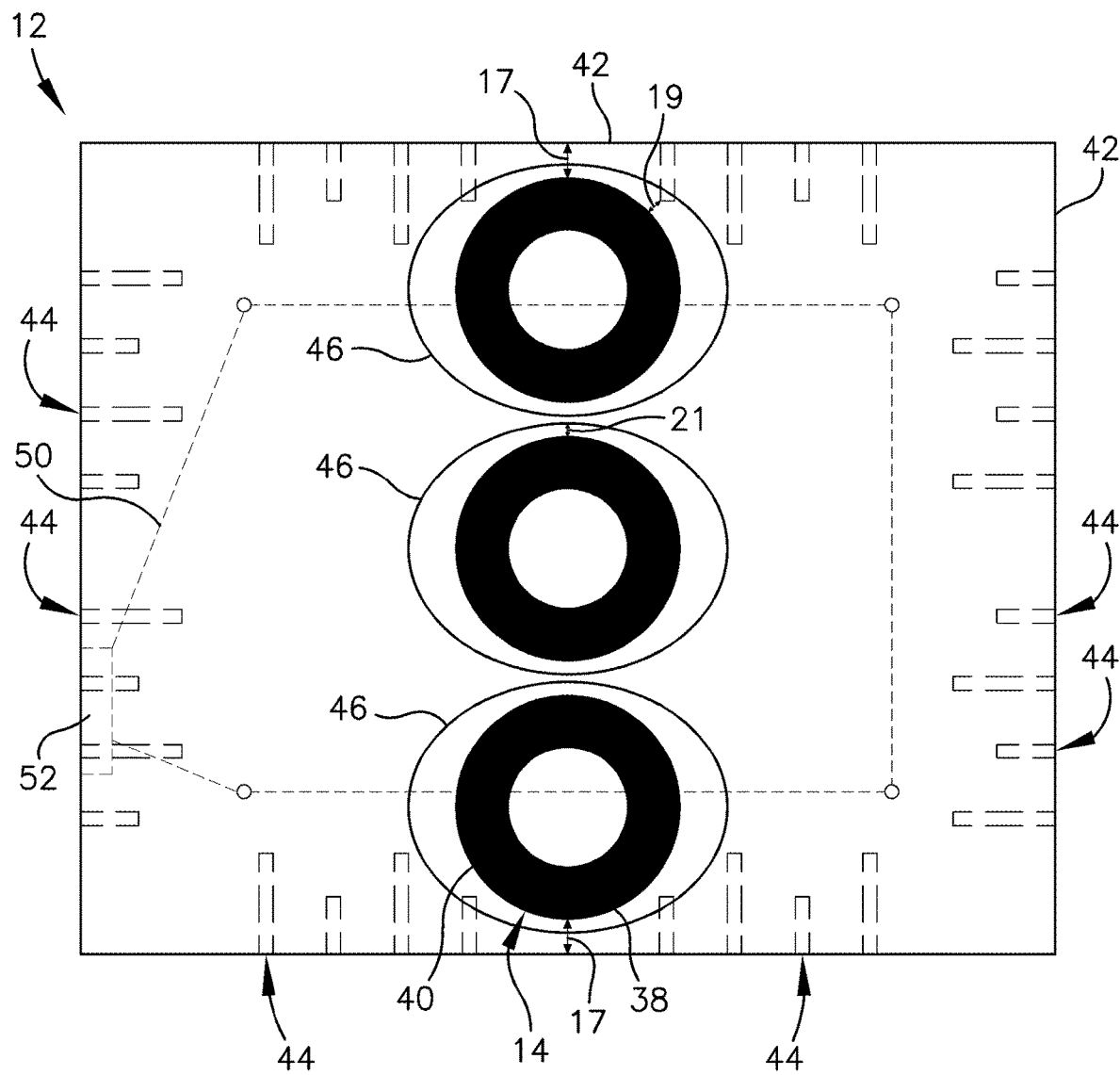
FIG. 2A is a schematic diagram depicting selected components of a slab of the pavement system of FIG. 1.

Turning to FIG. 2A, the conductive elements 15 of the wireless chargers 14 are located within the slabs 12 so that a minimal marginal region 17 of the slabs 12 separates outer portions of the conductive elements 15 of wireless chargers 14, and, more preferably, of the wireless chargers 14 more generally, from space outside the slabs 12 in order to protect the wireless chargers 14 and control magnetic field emissions. In other words, each of the conductive elements 15 of wireless chargers 14 defines an outer margin or profile 38 with an outer perimeter, in this case illustrated as outer radius 40, that is spaced apart at a minimum distance from side surfaces 42 and/or from each of cavities 44 of their respective slab 12.

In one or more embodiments, one or more of the wireless chargers 14 is positioned so that the outer perimeter or outer radius 40 of the corresponding conductive element(s) 15 is/are located a minimum distance 17 (e.g., a minimum horizontal distance) of at least two inches (2 in.) or about five centimeters (5 cm) away from the nearest portion of the corresponding side surface 42. In one or more embodiments, no portion of the wireless chargers 14 is closer than two inches (2 in.) or about five centimeters (5 cm) to any of the side surfaces 42.

Moreover, in one or more embodiments, no surface of a conductive element 15 of a wireless charger 14 is nearer than two inches (2 in.) to the nearest portion of the respective nearest corresponding side surface 42.

In one or more embodiments, one or more of the wireless chargers 14 are positioned so that the outer perimeter or outer radius 40 of their respective conductive element(s) 15 is/are a distance 19 (e.g., horizontal) of at least one inch (1 in.) or about two and a half centimeters (2.5 cm) away from the nearest portion of the nearest cavity 44. In one or more embodiments, that distance 19 is at least two inches (2 in.) or about five centimeters (5 cm). In one or more embodiments, that distance 19 is at least three inches (3 in.) or about seven and a half centimeters (7.5 cm).

Moreover, in one or more embodiments, no surface of a conductive element 15 of a wireless charger 14 is nearer than one inch (1 in.) to the nearest portion of the respective nearest cavity 44.

However, in one or more embodiments, the chargers 14 closest to respective ones of the side surfaces 42 are—while spaced from those side surfaces 42—nonetheless close enough to avoid wasting valuable space in the slab 12 and to provide a relatively uniform magnetic flux density above the slabs 12. For example, one or more (or each) of the wireless chargers 14 is positioned so that a closest surface of the outer perimeter or outer radius 40 of its conductive element 15 is located at least within a range of distances (e.g., horizontal distances) from the nearest portion of the nearest cavity 44. In one or more embodiments, the range of distances is between two inches (2 in.) and six inches (6 in.), or between five centimeters (5 cm) and fifteen centimeters (15 cm), inclusive. In one or more embodiments, the range of distances is between two inches (2 in.) and four inches (4 in.), or between five centimeters (5 cm) and ten centimeters (10 cm), inclusive. In one or more embodiments, the range of distances is between two inches (2 in.) and three inches (3 in.), or between five centimeters (5 cm) and seven and a half centimeters (7.5 cm), inclusive.

In one or more embodiments, the system 10 includes one or more sensor loop(s) 46 for detecting traffic data. Each sensor loop 46 may be positioned on an upper surface of one or more respective slab(s) 12 and/or embedded into the upper surface of the one or more respective slab(s) 12. Each sensor loop 46 may be positioned relative to one or more respective wireless charger(s) 14 so that it lies outside the outer perimeter or radius 40 of the conductive element(s) 15 of the wireless charger(s) 14. In other words, the sensor loops 46 are preferably positioned so as to encompass or enclose, but not impinge on, outer perimeters or profiles (e.g., outer radii 40) of one or more of the conductive elements 15 of the wireless chargers 14, were such outer perimeters or profiles 40 projected upward onto the nearest respective portions of the upper surfaces of the slab(s) 12. In one or more embodiments, one or more of the sensor loops 46 have a radius such that it lies at least a minimum offset distance 21 to the outer radius 40 of its respective wireless charger 14 if the respective wireless charger 14 is projected upward onto the nearest respective portions of the upper surface of the. In one or more embodiments, the minimum offset distance 21 is at least one half inch (0.5 in.) or about one centimeters (1 cm). In or more embodiments, one or more of the sensor loops 46 may extend over one or more of the cavities 44 (that is, if outer profiles of the cavities 44 were to be projected upward onto the nearest portions of the upper surface(s) of the slab(s) 12, the sensor sloop(s) 46 may intersect same). The sensor loops 46 may comprise conductive material, such as one or more conductor wires or the like.

Moreover, in one or more embodiments, no portion of any outer margin or profile 38 of any conductive element 15 of any wireless charger 14 is nearer than one inch (1 in.) to the nearest portion of any sensor loop 46. Also or alternatively, in one or more embodiments, none of the outer perimeters or profiles (e.g., outer radii 40) of the conductive elements 15 of the wireless chargers 14, if such outer perimeters or profiles 40 are projected upward onto the nearest respective portions of the upper surfaces of the slab(s) 12 or in plane(s) coincident with the loop(s) 46, are impinged on or intersect with any sensor loop 46, thereby avoiding significant interference by the sensor loop(s) 46 with the magnetic field generated by the conductive elements 15 for wireless charging of passing vehicles.

Figure 2B:
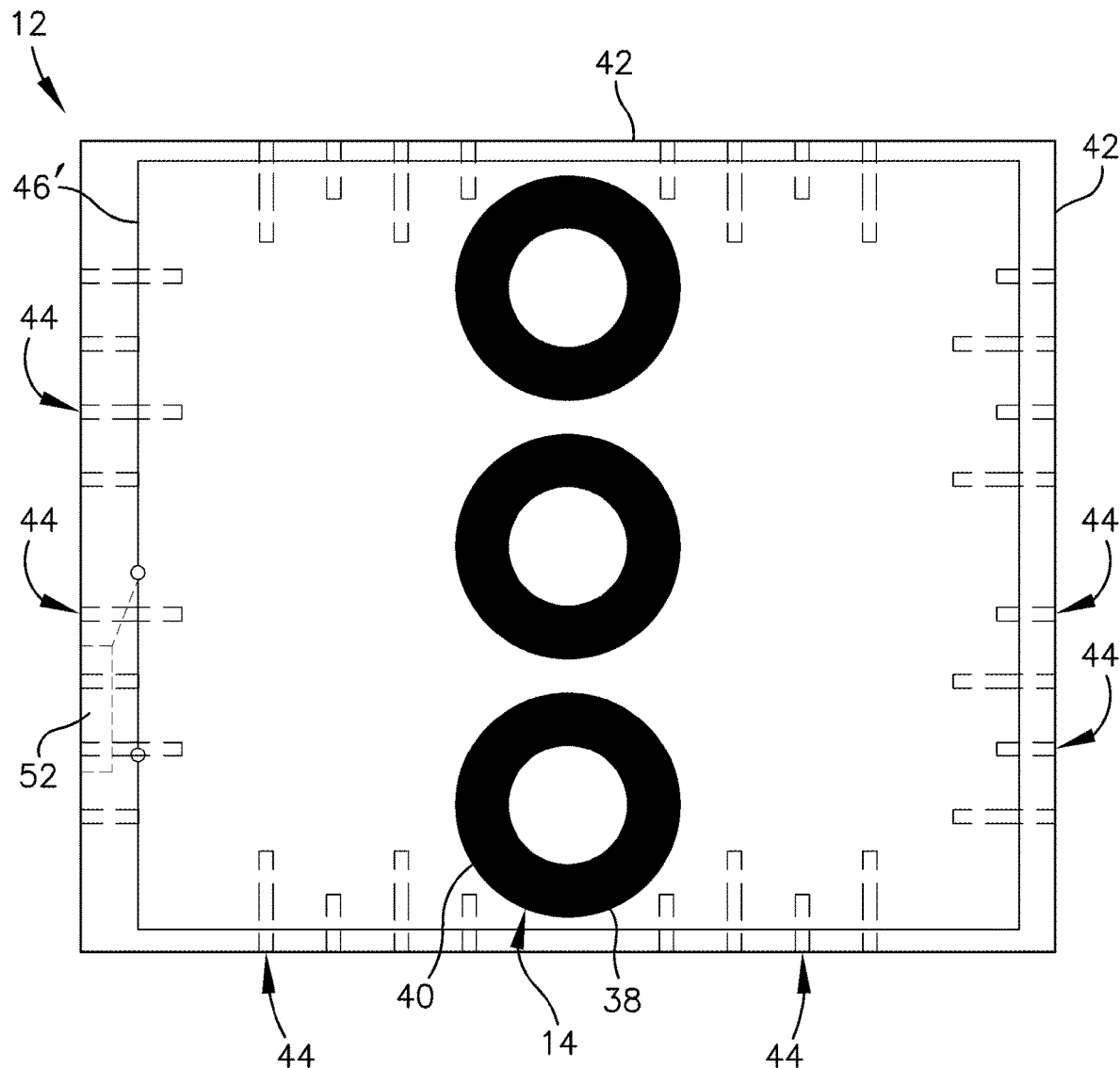
FIG. 2B is a schematic diagram depicting selected components of another embodiment of a slab of the pavement system of FIG. 1.

The sensor loops 46 shown in FIG. 2A are implemented as circular or ovate loops. However, one of ordinary skill will appreciate that sensor loops may be implemented within or atop a body of pavement material in other patterns—for example, in a serpentine pattern layout, a coil pattern layout, a grid pattern, an array of individual conductors, or other geometric pattern layouts—without departing from the spirit of the present invention. Moreover, a sensor loop may include more or fewer conductors and/or may comprise additional or alternative magnetic sensors (e.g., Hall Effect sensors) without departing from the spirit of the present invention. For example, in one or more embodiments, the sensor loop 46' may extend along an outer marginal region of the slabs 12, as depicted in FIG. 2B.

Returning to FIG. 1, the master controller of the control center 16 may additionally be in electronic communication (e.g., via wired connections 50 of FIG. 2) with and may receive sensor loop data from the sensor loops 46 embedded in or positioned on the slabs 12. The wired connections 50 may be routed via edge connectors 52 through one or more junction boxes 54 illustrated in FIG. 1 for communication to the master controller. The master controller may analyze the sensor loop data, alone and/or in communication with one or more remote server(s), to determine vehicle position(s), velocity and/or presence and, accordingly, provide commands for activation/deactivation of the wireless chargers 14 and/or increasing or decreasing the voltage supplied to the wireless chargers 14 for wireless charging of the vehicle.

The communication element 26 generally allows communication with systems or devices external to the control center 16. The communication element 26 may include signal or data transmitting and receiving circuits, such as antennas, amplifiers, filters, mixers, oscillators, digital signal processors (DSPs), and the like. The communication element 26 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 26 may establish communication through connectors or couplers that receive metal conductor wires or cables which are compatible with networking technologies such as ethernet. The communication element 26 may also couple with optical fiber cables, e.g., via an interrogator. The communication element 26 may be in communication with or electronically coupled to memory element 24 and/or processing element 22.

Preferably the devices of the pavement system communicate via secure and/or encrypted communication means. For example, all or some of the slabs 12, the control center 16 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 24 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 24 may include, or may constitute, a "computer-readable medium." The memory element 24 may store the instructions, code, code segments, software, firmware, programs, applications, apps, services, daemons, or the like that are executed by the processing element 22, such as the software program 28. The memory element 24 may also store settings, data, documents, files, photographs, movies, images, databases, and the like, for example where such data is captured by additional infrastructure sensors and/or relates to utilization of the wireless chargers 14 by passing vehicles.

The processing element 22 may include processors, microprocessors, microcontrollers, DSPs, field-programmable gate arrays (FPGAs), analog and/or digital application-specific integrated circuits (ASICs), or the like, or combinations thereof. The processing element 22 may include digital processing unit(s). The processing element 22 may generally execute, process, or run instructions, code, code segments, software, firmware, programs, applications, apps, processes, services, daemons, or the like. The processing element 22 may also include hardware components, such as finite-state machines, sequential and combinational logic, and other electronic circuits that may perform the functions necessary for the operation of embodiments of the present invention. For example, the processing element 22 may execute the software program 28, where the software program 28 includes computer-readable instructions instructing the processing element 22 to complete all or some of the steps described herein. The processing element 22 may be in communication with the other electronic components through serial or parallel links that include address busses, data busses, control lines, and the like.

Figure 3:
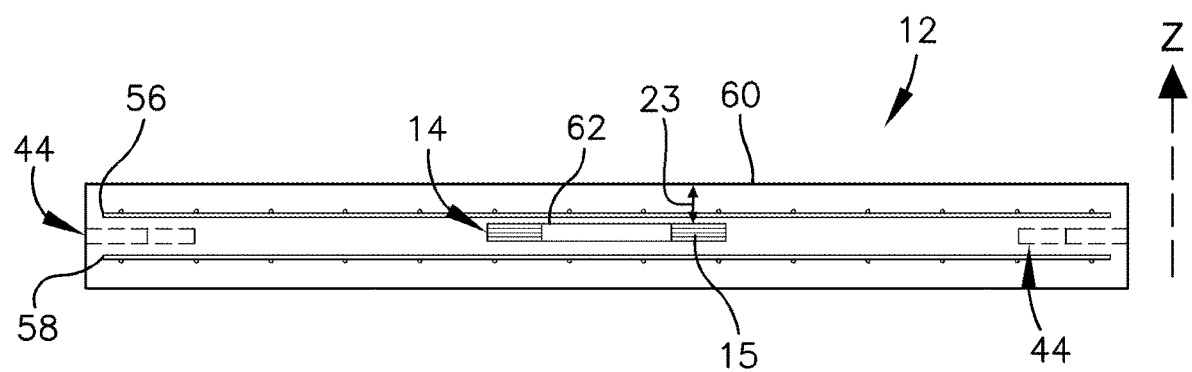
FIG. 3 is a cross section of a roadway section from the pavement system of FIG. 1, taken along an x-axis of the system and bisecting a wireless power charger, particularly illustrating the wireless power charger positioned between an upper reinforcement layer and a lower reinforcement layer, all embedded within the roadway section.

Turning to FIG. 3, the wireless power chargers 14 are located or embedded within the volume of paving material comprising their respective slabs 12. The outer profile or margin 38 of each of the conductive elements 15 of the wireless power chargers 14 includes an upper surface 62 that is located a minimum distance 23 from a top surface 60 of its respective slab 12. In one or more embodiments, the upper surface 62 of the conductive element(s) 15 of the wireless power chargers 14 are at the minimum distance 23 from the portion of the top surface 60 that is directly above that top surface 62. For example, in one or more embodiments, one or more portions of the top surface 60 of some of the slabs 12 may be sloped along the x- and/or y-directions (these axes are depicted in FIG. 1). Additionally or alternatively, one or more of the slabs 12 may have a varied thickness. In such embodiments, the upper surfaces 62 of the wireless power chargers 14 may be sloped with, or parallel with, the sloped portions of the top surfaces 60 of their respective slabs 12. Alternatively or additionally, one or more of the upper surfaces 62 of the wireless power chargers 14 may be oblique to the top surface 60 of its respective slab 12 with the portion of the upper surface 62 closest to the top surface 60 being at least the minimum distance 23 from the top surface 60 directly above said closest upper surface 62.

In one or more embodiments, the minimum distance is at least about one inch (1 in.) or at least about two and a half centimeters (2.5 cm). In one or more embodiments, the minimum distance is at least about two inches (2 in.) or at least about five centimeters (5 cm). In one or more embodiments, the minimum distance is at least about three inches (3 in.) or at least about seven and a half centimeters (7.5 cm).

Moreover, in one or more embodiments, no surface of a conductive element 15, including the upper surface 62, is nearer to any portion of the top surface 60 of its corresponding slab 12 than one inch (1 in.).

In one or more embodiments, the slabs 12 may also each include one or more internal reinforcement element(s) 56, 58. One of the internal reinforcement elements 56 may be located in its respective slab 12 between the corresponding wireless power chargers 14 and the top surface 60 of its respective slab 12. Additionally or alternatively, in one or more of the embodiments, the other reinforcement element 58 may be located in its respective slab 12 below the corresponding wireless power chargers 14.

Each internal reinforcement element 56, 58 may comprise a grid of at least one layer of steel rebar lattice or other internal reinforcement structures such as fiberglass reinforcement mat, geotechnical mat, composite bars, carbon fiber mat, or loose reinforcement material such as fiberglass fibers, carbon fibers, plastic fibers, or metallic shavings. In one or more embodiments, the upper internal reinforcement grid 56 comprises only those materials listed above or otherwise which are non-metallic, non-ferrite material(s) and will not substantially interfere with, shield against, insulate and/or isolate the electromagnetic field (EMF) emitted upward from the wireless chargers 14, which are positioned below the upper internal reinforcement grids 56. More broadly, it is foreseen that embodiments of the present inventive concept are interoperable with the paving systems and apparatuses described in U.S. Patent Publication No. 2016-0222594 A1 to Sylvester (filed Mar. 30, 2016), and in U.S. Patent Publication No. 2017-0191227 A1 to Sylvester (filed May 16, 2016), each of which is hereby incorporated by reference herein in its entirety.

Figure 4:
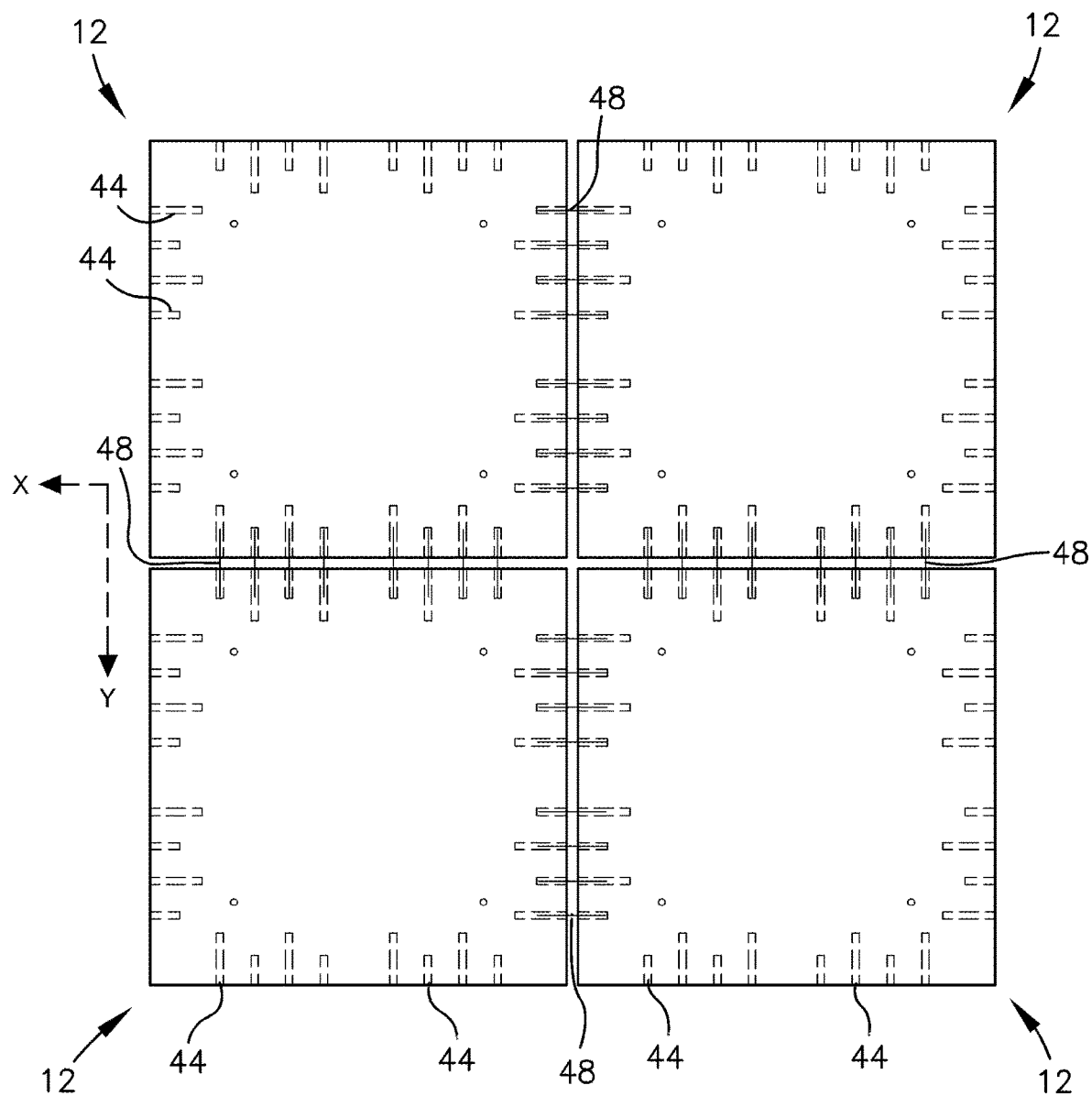
FIG. 4 is a schematic diagram depicting interconnecting structural components of a plurality of slabs of the pavement system of FIG. 1.

While it is foreseen, as noted above, that embodiments of the present invention may be constructed in the field—for example as part of cast-in-place concrete or continuous pour asphalt installations—or be pre-fabricated into an assembly that can be installed onsite, it is preferred that the sensor loops 46 be encased and permanently fixed within slabs 12 during an offsite pre-fabrication process. The sensors of the exemplary array 46 may be laminated and/or fixed to one or more sides of a reinforcement layer 56, 58 (fixed relationship not shown, but see, e.g., FIGS. 2-4 of U.S. Patent Publication No. 2017/0191227A1 incorporated by reference herein) of the slab 12 during fabrication, essentially extending in a substantially horizontal (XY) plane at a given height within the slabs 12.

It is foreseen that all or portions of loop sensors 46 may be encased at different and/or varying heights within a slab without departing from the spirit of the present inventive concept. For instance, disposing at least one sensor at a different height within the slab 12—such as vertically above or below a second sensor—may provide additional resolution for detecting defects in the chargers 14.

As noted above, in one or more embodiments, load-transferring connectors 48 (see FIG. 4) set in cavities 44 join the slabs 12 to one another along sides extending perpendicular to the direction of travel (i.e., in the "x" direction). In one or more embodiments, load-transferring connectors 48 also join the slabs 12 to one another along sides extending parallel to the direction of travel (i.e., in the "y" direction). The load-transferring connectors 48 may comprise, for example, dowel rods. However, in one or more embodiments, slabs 12 adjacent one another in the "x" direction may be joined using tie bars (not shown) or other load-transferring connectors. Interfaces between slabs 12 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Figure 6:
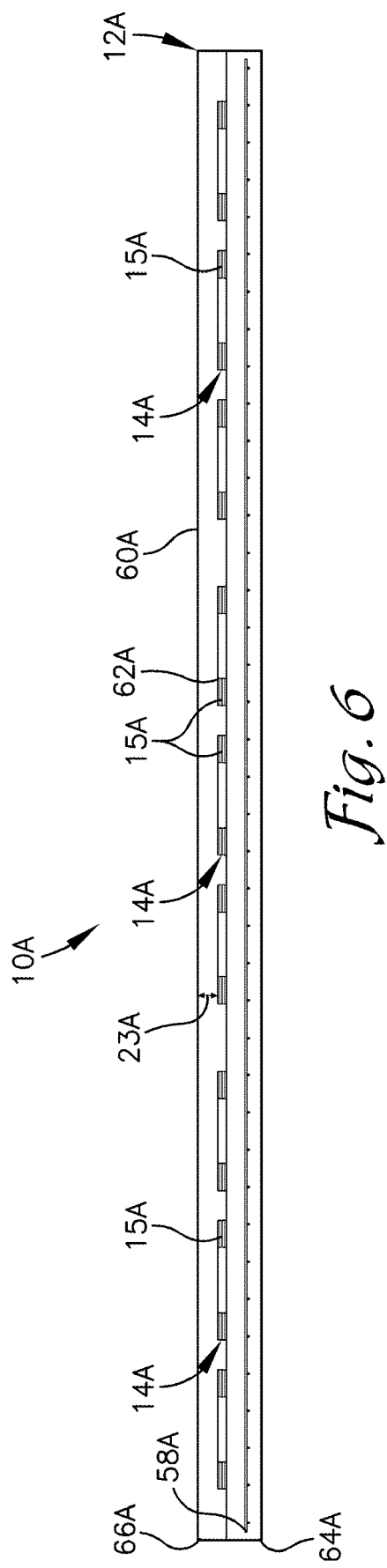
FIG. 6 is a cross section of roadway sections from the pavement system of FIG. 1, taken along or parallel to a y-axis of the system and bisecting a plurality of wireless power chargers, particularly illustrating the wireless power chargers positioned above a lower reinforcement layer, all embedded within the roadway section.

A pavement system 10A constructed in accordance with another embodiment of the invention is shown in FIG. 6. The pavement system 10A may comprise substantially similar components as pavement system 10; thus, the components of the pavement system 10A that correspond to similar components in pavement system 10 have an 'A' appended to corresponding reference numerals. The principal detail added to pavement system 10A relative to pavement system 10 is that the slabs or roadway sections 12A are at least partly formed of continuous pour asphalt pavement material.

In one or more embodiments, the slabs 12A include a base layer 64A comprising, for example, reinforced concrete as depicted, and a top layer 66A of asphalt poured on top of the base layer 64A. It is foreseen that the base layer 64A may comprise other materials without departing from the scope of the present invention. For example, the base layer 64A may comprise pre-existing pavement material, course asphalt, an intermediate asphalt layer, a drainage layer, asphalt concrete base course, cement stabilized aggregate, or the like. One or more base layers of the slabs 12A, such as the base layer 64A, may include one or more reinforcement elements 58A, as discussed elsewhere herein.

The wireless chargers 14A are located on and/or embedded within the base layer 64A. In one or more embodiments, the upper surfaces 62A of the conductive elements 15A of the wireless chargers 14A, and, preferably, all surfaces of the wireless chargers 14A more generally, are located a minimum distance 23A of at least about four inches (4 in.) or at least about ten centimeters (10 cm) below the top surface 60A of the slabs 12A, depending on the thickness of the top asphalt layer. As discussed above, in one or more embodiments, each of the upper or nearest surfaces 62A of the conductive elements 15A of the wireless chargers 14A is positioned at least the minimum distance 23A from the corresponding portion of the top surface 60A directly above that upper surface 62A. This minimum distance 23A allows portions of the top layer 66A to be replaced, resurfaced, and/or otherwise repaired without damaging the wireless chargers 14A. Electrical conductors electrically connected to the chargers 14A may also be placed on and/or embedded into the base layer 64A.

A pavement system 10B constructed in accordance with another embodiment of the invention is shown in FIG. 7. The pavement system 10B may comprise substantially similar components as pavement system 10; thus, the components of the pavement system 10B that correspond to similar components in pavement system 10 have a 'B' appended to corresponding reference numerals. The principal detail added to pavement system 10B relative to pavement system 10 is that the slabs 12B are formed of cast-in-place concrete installations. The cast-in-place roadway sections may include one or more lengths of roadway separated by saw cut joints 68B for reducing damage/cracking due to cyclical expansion and contraction.

The sawcut joints 68B comprise laterally extending (along the x-axis in FIG. 1) channels formed in the cast-in-place sections of the slabs 12B. The conductive elements 15B of the wireless chargers 14B, and, preferably, the wireless chargers 14B more generally, are positioned so that the joints 68B are formed in the slabs 12B at a minimum distance from, such as horizontally or laterally—the conductive elements 15B, with a minimum margin of slab material therebetween. The joints 68B are formed so that a minimum distance is maintained between the conductive elements 15B of the wireless chargers 14B, and, preferably, between the wireless chargers 14B more generally, and the closest portion(s) of the adjacent joints 68B. For example, the joints 68B may include lower surfaces 70B, and the outer radiuses 40B of the profiles of the wireless chargers 14B are positioned away from the lower surfaces 70B at a minimum distance of at least one inch (1 in.) or about two and a half centimeters (2.5 cm). In one or more embodiments, the outer radius 40B of the profile of each of the wireless chargers 14B is located at a horizontal distance of at least two inches (2 in.) or about five centimeters (5 cm) from the lower surface 70B of the nearest sawcut joint 68B.

As shown in FIG. 8, in one or more embodiments, the joints 68B may be formed so that opposing walls defining the joints 68B extend along imaginary planes, and the outer radiuses 40B of the nearest charging elements 14B may be respectively distanced from the imaginary planes by distances d, d'. In one or more embodiments, the distances d, d' may be at least one inch (1 in.) or about two and a half centimeters (2.5 cm). In one or more embodiments, the distances d, d' may be at least two inches (2 in.) or about five centimeters (5 cm).

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element 24d other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A roadway section for enabling dynamic wireless power transfer to a vehicle, the roadway section comprising:
   pavement material defining a pavement section volume having a top surface on which the vehicle traverses; and
   a wireless power charger including a conductive element located at least partially within the pavement section volume and configured to emit a magnetic field toward the top surface of the pavement section volume to wirelessly transfer electric power to the vehicle,
   wherein the conductive element includes an upper surface that is located at least five centimeters (5 cm) below the top surface of the pavement section volume, the pavement material comprises a precast slab, the precast slab comprises side surfaces and at least one cavity formed in at least one of the side surfaces, the at least one cavity being operable to receive a load transferring connector, and the conductive element defines a profile with an outer radius, and the pavement section volume includes a portion outside the outer radius of the profile, further comprising a sensor loop located at least partially above the portion outside the outer radius of the profile.

2. The roadway section of claim 1, wherein the pavement material comprises asphalt, and the upper surface of the conductive element is at least ten centimeters (10 cm) below the top surface of the pavement section volume.

3. The roadway section of claim 1, comprising a plurality of conductive elements including the conductive element, the plurality of conductive elements being located at least partially within the pavement section volume and having respective ones of a plurality of upper surfaces including the upper surface, each of the plurality of upper surfaces being located at least five centimeters (5 cm) below the top surface of the pavement section volume.

4. The roadway section of claim 1, wherein the upper surface of the conductive element is located at least seven and a half centimeters (7.5 cm) below the top surface of the pavement section volume.

5. The roadway section of claim 1, wherein a portion of the sensor loop is located above the at least one cavity.

6. The roadway section of claim 1, wherein the pavement section volume includes an outer region in which the at least one cavity is formed and an inner region adjacent to the outer region, wherein the conductive element is located entirely within the inner region of the pavement section volume.

7. The roadway section of claim 6, wherein the conductive element defines a profile with an outer radius that is located a minimum distance of five centimeters (5 cm) to fifteen and a half centimeters (15.5 cm), inclusive, from the at least one cavity.

8. The roadway section of claim 1, further comprising a first reinforcement element located in the pavement section volume nearer to the top surface of the pavement section volume than any of the plurality of conductive elements.

9. The roadway section of claim 8, further comprising a second reinforcement element located in the pavement section volume further from the top surface than any of the plurality of conductive elements.

10. A roadway section for dynamic wireless power transfer to a vehicle, the roadway section comprising:
a plurality of precast pavement slabs, each of the plurality of precast pavement slabs having a top surface on which the vehicle traverses and side surfaces for abutting adjacent ones of the plurality of precast pavement slabs, the plurality of precast pavement slabs collectively defining a pavement section volume having a top surface on which the vehicle traverses; and
a plurality of wireless power chargers each respectively comprising a conductive element, each of a plurality of conductive elements being located at least partially within one of the plurality of precast pavement slabs and configured to transfer electric power to the vehicle as the vehicle traverses the top surface,
wherein each of the plurality of conductive elements includes an upper surface that is located at least five centimeters (5 cm) below the corresponding one of the top surfaces, each of the plurality of precast pavement slabs comprises at least one cavity formed in at least one of the side surfaces, the at least one cavity being operable to receive a load transferring connector, and further comprising a sensor loop located nearer the top surface of each of the plurality of precast pavement slabs than the corresponding ones of the plurality of conductive elements, the sensor loop defining an inner area through which one or more of the plurality of conductive elements is operable to emit a magnetic field.

11. The roadway section of claim 10, wherein the sensor loop is located below the top surface of one of the plurality of precast pavement slabs.

12. The roadway section of claim 10, wherein each of the plurality of conductive elements is located at least seven and a half centimeters (7.5 cm) below the corresponding one of the top surfaces of the plurality of precast pavement slabs.

13. The roadway section of claim 10, wherein the pavement material comprises asphalt, and the upper surface of each of the plurality of conductive coils is no closer than ten centimeters (10 cm) to the top surface of the pavement section volume.

14. The roadway section of claim 10, further comprising a first reinforcement element located in the pavement section volume nearer to the top surface than any of the plurality of conductive coils.

15. The roadway section of claim 14, further comprising a second reinforcement element located in the pavement section volume further from the top surface than any of the plurality of conductive coils.

16. The roadway section of claim 10 wherein the pavement section volume includes an outer region in which the at least one cavity of each of the plurality of precast pavement slabs is formed and an inner region adjacent to the outer region, wherein the conductive element is located entirely within the inner region of the pavement section volume.

17. The roadway section of claim 10, wherein a portion of the sensor loop of each of the plurality of precast pavement slabs is located above the at least one cavity of the respective slab.

* * * * *